United States Patent
Rex

(10) Patent No.: US 10,264,922 B2
(45) Date of Patent: Apr. 23, 2019

(54) DEEP FRYER SYSTEM

(71) Applicant: Gary Rex, Salisbury, NC (US)

(72) Inventor: Gary Rex, Salisbury, NC (US)

(73) Assignee: Gary Rex, Salisbury, NC (US)

(*) Notice: Subject to any disclaimer, the term of this patent is extended or adjusted under 35 U.S.C. 154(b) by 240 days.

(21) Appl. No.: 15/485,770

(22) Filed: Apr. 12, 2017

(65) Prior Publication Data

US 2018/0296036 A1    Oct. 18, 2018

(51) Int. Cl.
*F24C 3/14* (2006.01)
*A47J 37/12* (2006.01)

(52) U.S. Cl.
CPC ....... *A47J 37/1276* (2013.01); *A47J 37/1242* (2013.01); *A47J 37/1247* (2013.01); *A47J 37/1257* (2013.01); *A47J 37/1285* (2013.01); *F24C 3/14* (2013.01)

(58) Field of Classification Search
CPC .................................. A47J 37/12; F24C 3/14
USPC ............................................ 126/390.1, 41 R
See application file for complete search history.

(56) References Cited

U.S. PATENT DOCUMENTS

| | | | |
|---|---|---|---|
| 3,217,634 A | 11/1965 | Fox | |
| 3,722,498 A * | 3/1973 | Kimbrough | A47J 37/1242 126/38 |
| D229,661 S | 12/1973 | Lambertson | |
| 3,789,822 A * | 2/1974 | Schantz | A47J 37/1242 126/25 R |
| 3,973,481 A * | 8/1976 | Mies | A47J 27/0817 99/408 |
| 4,444,095 A * | 4/1984 | Anetsberger | A47J 37/1223 210/184 |
| 4,623,544 A * | 11/1986 | Highnote | A47J 37/1233 426/233 |
| 4,905,664 A | 3/1990 | Dunham | |
| 4,945,893 A * | 8/1990 | Manchester | A47J 37/1223 126/391.1 |
| 5,642,660 A | 7/1997 | Killgore et al. | |
| 5,832,810 A * | 11/1998 | Brawley, Sr. | A47J 37/1271 99/408 |
| D414,649 S * | 10/1999 | King | D34/14 |
| D462,567 S * | 9/2002 | Smith | D7/354 |
| 9,055,839 B1 | 6/2015 | Bourgeois | |
| D803,613 S * | 11/2017 | Dominique | D7/347 |

FOREIGN PATENT DOCUMENTS

WO    WO2007149126    12/2007

* cited by examiner

*Primary Examiner* — Gregory L Huson
*Assistant Examiner* — Nikhil P Mashruwala

(57) ABSTRACT

A deep fryer system includes a deep fryer that includes a fuel tank, a burner and a hose that is fluidly coupled between the fuel tank and the burner. The burner produces a flame thereby facilitating the burner to heat a container filled with a fluid. A cart is provided and each of the fuel tank, the hose and the burner is removably positioned on the cart. A box is provided and the box is positioned on the cart. The burner is positioned within the box and the container is positioned within the box. The box inhibits the fluid in the container from escaping the box thereby reducing a fire hazard with respect to the fluid when the fluid is heated.

9 Claims, 5 Drawing Sheets

DEEP FRYER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to fryer devices and more particularly pertains to a new fryer device for reducing a fire hazard associate with deep frying a turkey or the like.

BRIEF SUMMARY OF THE INVENTION

An embodiment of the disclosure meets the needs presented above by generally comprising a deep fryer that includes a fuel tank, a burner and a hose that is fluidly coupled between the fuel tank and the burner. The burner produces a flame thereby facilitating the burner to heat a container filled with a fluid. A cart is provided and each of the fuel tank, the hose and the burner is removably positioned on the cart. A box is provided and the box is positioned on the cart. The burner is positioned within the box and the container is positioned within the box. The box inhibits the fluid in the container from escaping the box thereby reducing a fire hazard with respect to the fluid when the fluid is heated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
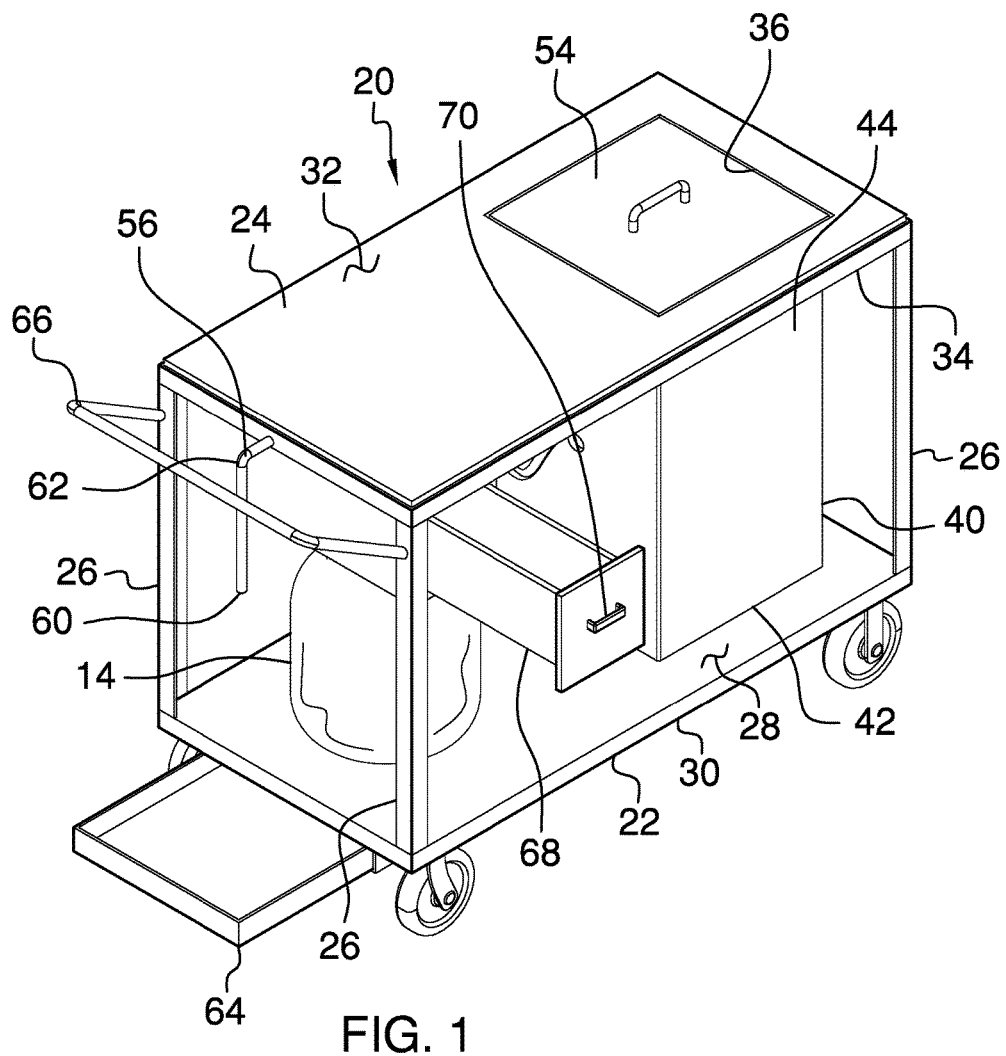
FIG. 1 is a top perspective view of a deep fryer system according to an embodiment of the disclosure.
Figure 2:
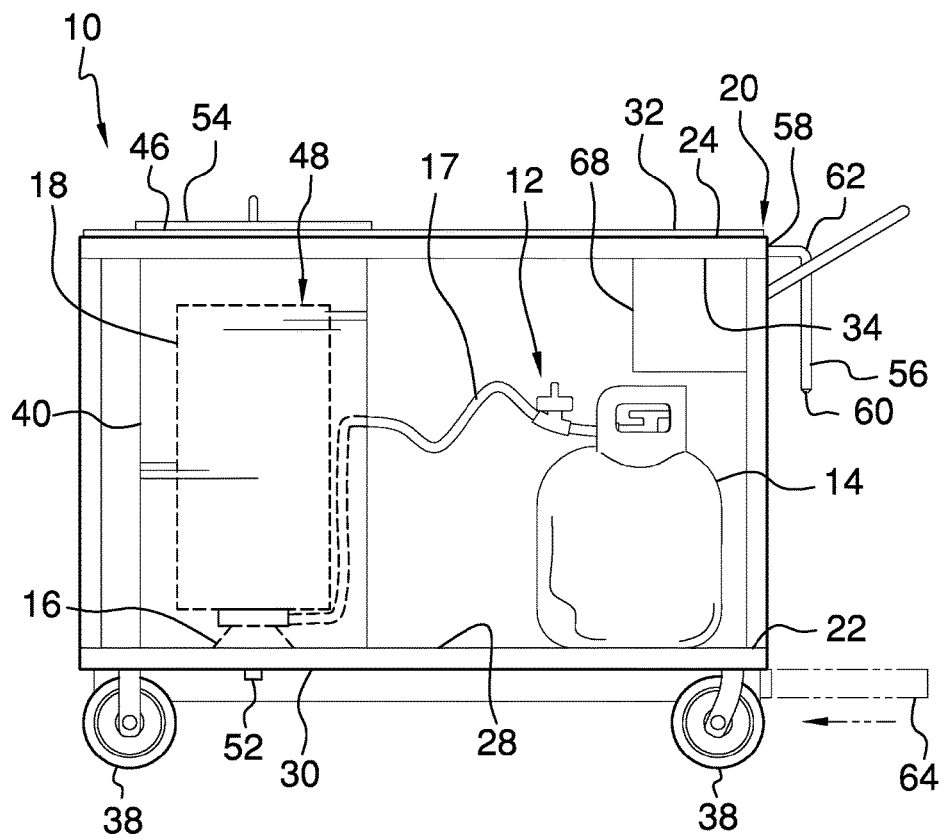
FIG. 2 is a back view of an embodiment of the disclosure.
Figure 3:
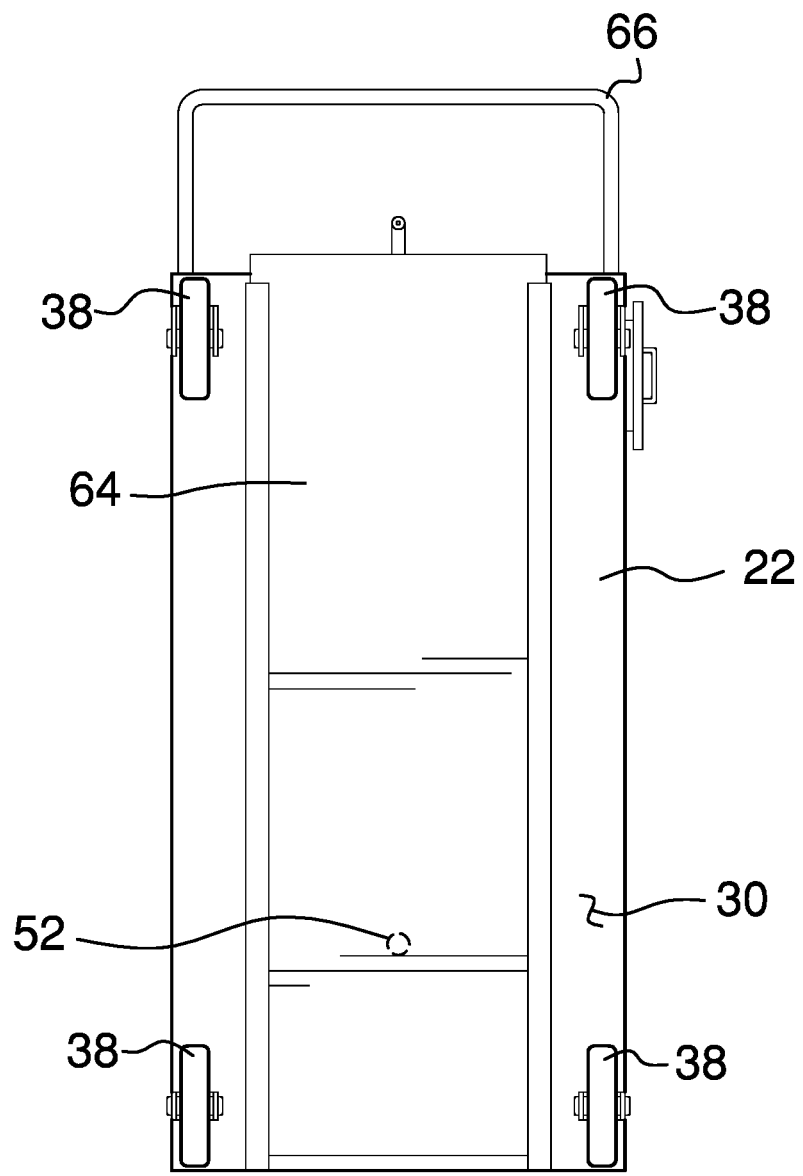
FIG. 3 is a bottom view of an embodiment of the disclosure.
Figure 4:
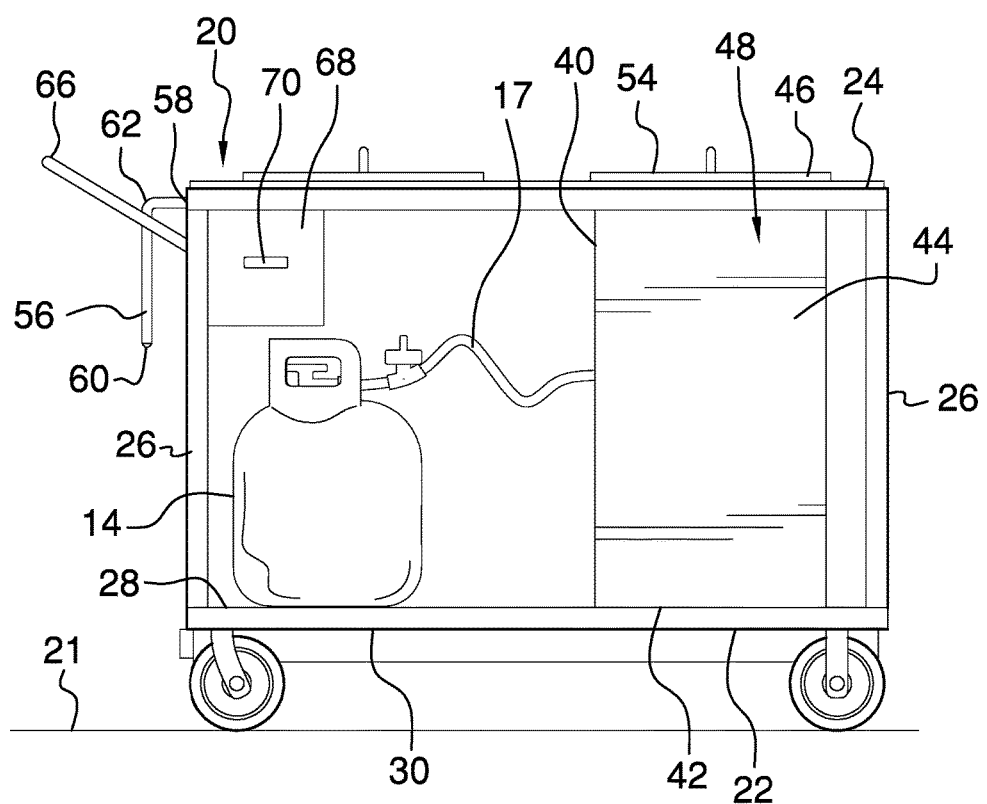
FIG. 4 is a front view of an embodiment of the disclosure.
Figure 5:
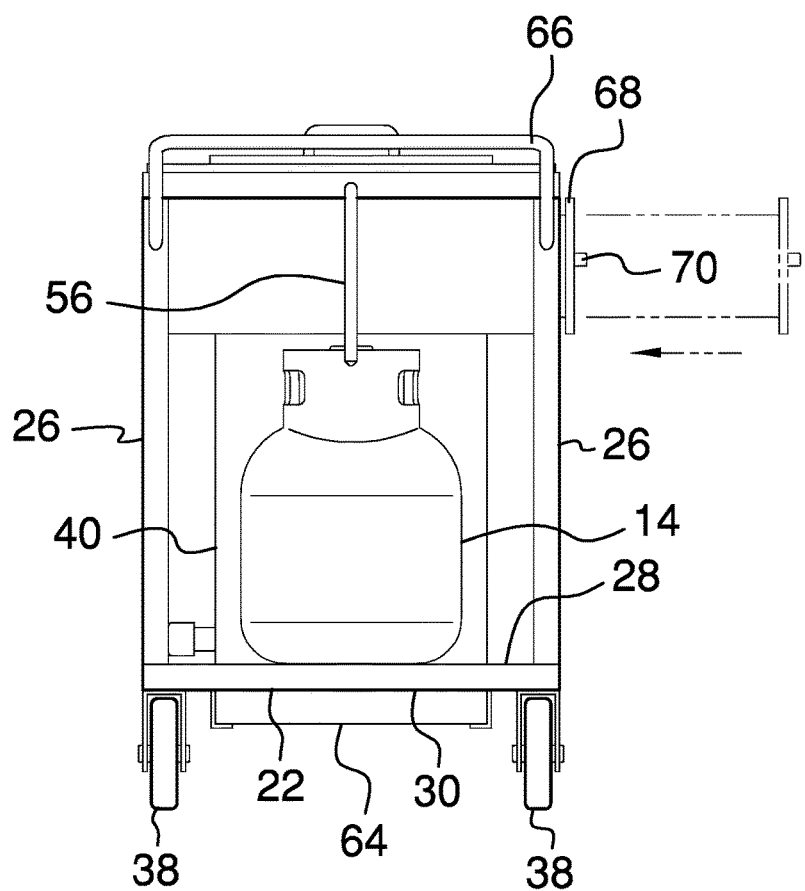
FIG. 5 is a right side view of an embodiment of the disclosure.

With reference now to the drawings, and in particular to FIGS. 1 through 5 thereof, a new fryer device embodying the principles and concepts of an embodiment of the disclosure and generally designated by the reference numeral 10 will be described.

As best illustrated in FIGS. 1 through 5, the deep fryer system 10 generally comprises a deep fryer 12 including a fuel tank 14, a burner 16 and a hose 17 that is fluidly coupled between the fuel tank 14 and the burner 16. The burner 16 produces a flame thereby facilitating the burner 16 to heat a container 18 filled with a fluid. The container 18 may be a pot and the fluid may be cooking oil. Additionally, the fuel tank 14 may be a propane tank or the like and the burner 16 may be a propane burner 16 or the like. The container 18 selectively contains a food item, such as a whole turkey or other food item, intended to be deep fried.

A cart 20 is provided and the cart 20 is selectively rolled along a support surface 21. Each of the fuel tank 14, the hose 17 and the burner 16 is removably positioned on the cart 20. The cart 20 has a first panel 22, a second panel 24 and a plurality of uprights 26. The first panel 22 has a top surface 28 and a bottom surface 30 and the second panel 24 has an upper surface 32 and a lower surface 34. Each of the uprights 26 extends between the top surface 28 of the first panel 22 and the lower surface 34 of the second panel 24. The second panel 24 has an aperture 36 extending through the upper surface 32 and the lower surface 34 and the fuel tank 14 is positioned on the top surface 28 of the first panel 22. The cart 20 may have a length ranging between 120.0 cm and 130.00, a width ranging between 60.0 cm and 75.0 cm and a height ranging between 75.0 cm and 100.0 cm.

A plurality of wheels 38 is provided and each of the wheels 38 is rotatably coupled to the bottom surface 30 of the first panel 22 to roll along the support surface 22. A box 40 is positioned on the cart 20 and the burner 16 is positioned within the box 40. The container 18 is positioned within the box 40 and the box 40 inhibits the fluid in the container 18 from escaping the box 40. In this way the box 40 reduces a fire hazard with respect to the fluid when the fluid is heated. Each of the cart 20 and the box 40 is comprised of a fire resistant material such as steel or the like.

The box 40 has a bottom wall 42 and a perimeter wall 44 extending upwardly therefrom. The perimeter wall 44 has a distal edge 46 with respect to the bottom wall 42 to define an opening 48 into an interior of the box 40. The bottom wall 42 is positioned on the top surface 28 of the first panel 22 and the box 40 extends upwardly through aperture 36 in the second panel 24 having the distal edge 46 being spaced from the upper surface 32 of the second panel 24.

The perimeter wall 44 has a hole 50 extending into an interior of the box 40 and the hose 17 is extended through the hole 50. A drain 52 extends through the bottom wall 42 of the box 40 wherein the drain 52 selectively drains the fluid from the box 40 when the fluid overflows from the container 18. A lid 54 is provided and the lid 54 is selectively positioned on the distal edge 46 of the box 40 to cover the opening 48 in the box 40.

A rod 56 is coupled to and extends away from a peripheral edge 58 of the second panel 24 and the rod 56 has a distal end 60 with respect to the peripheral edge 58. The rod 56 has a bend 62 thereon and the bend 62 is positioned between the peripheral edge 58 and the distal end 60. The distal end 60 is directed downwardly and the food item is selectively suspended on the rod 56 when the food item is finished is fried thereby facilitating grease to drip from the food item. A pan 64 is slidably coupled to the bottom surface 30 of the bottom wall 42. The pan 64 is selectively urged into an extended position having the pan 64 being aligned with the distal end 60 of the rod 56. In this way the pan 64 catches the grease dripping from the food item. The pan 64 may be slidably coupled to the first panel 22 with a pair of rails or any other conventional means of slidably coupling the pan 64 to the first panel 22.

A handle 66 is coupled to the cart 20 and the handle 66 selectively manipulated thereby facilitating the cart 20 to be urged along the support surface 22. The handle 66 may include a central member extending between a pair of outward members. Each of the outward members may be attached to an associated one of the uprights 26 having the central member being spaced from the cart 20. A drawer 68 is slidably coupled to the lower surface 34 of the second panel 24 to store objects. A grip 70 may be coupled to the drawer 68 and the grip 70 may be gripped for opening and closing the drawer 68. Moreover, the drawer 68 may be slidably coupled to the second panel 24 with a pair of rails or any other conventional means of slidably coupling the drawer 68 to the second panel 24.

In use, the burner 16 is positioned in the box 40 and the hose 17 is fluidly coupled between the fuel tank 14 and the burner 16. The container 18 is placed in the box 40 such that the container 18 sits on the burner 16 and the container 18 is filled with the fluid. The food item is placed in the container 18 to deep fry the food item and the lid 54 is placed on the box 40. In this way the box 40 and the lid 54 reduce a risk of fire with respect to the heated fluid in the container 18. The food item is removed from the container 18 and the food item is suspended from the rod 56 when the food item is finished frying. The pan 64 is extended outwardly from the first panel 22 to capture the grease dripping from the food item.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A deep fryer system comprising:
    a deep fryer including a fuel tank, a burner and a hose being fluidly coupled between said fuel tank and said burner wherein said burner is configured to produce a flame thereby facilitating said burner to heat a container filled with a fluid;
    a cart being configured to be rolled along a support surface, each of said fuel tank, said hose and said burner being removably positioned thereon; and cart having a first panel, a second panel and a plurality of uprights, said first panel having a top surface and a bottom surface, said second panel having an upper surface and a lower surface, each of said uprights extending between said top surface of said first panel and said lower surface of said second panel, said second panel having an aperture extending through said upper surface and said lower surface, said fuel tank being positioned on said top surface of said first panel
    a box being positioned on said cart, said burner being positioned within said box, said box being configured to have the container being positioned within said box, said box being configured to inhibit the fluid in the container from escaping said box thereby reducing a fire hazard with respect to the fluid when the fluid is heated.

2. The system according to claim 1, further comprising a plurality of wheels, each of said wheels being rotatably coupled to said bottom surface of said first panel wherein each of said wheels is configured to roll along the support surface.

3. The system according to claim 1, wherein said box having a bottom wall and a perimeter wall extending upwardly therefrom, said perimeter wall having a distal edge with respect to said bottom wall to define an opening into an interior of said box, said bottom wall being positioned on said top surface of said first panel, said box extending upwardly through aperture in said second panel having said distal edge being spaced from said upper surface of said second panel, said perimeter wall having a hole extending into an interior of said box, said hose being extended through said hole.

4. The system according to claim 3, further comprising a drain extending through said bottom wall of said box wherein said drain is configured to selectively drain the fluid from said box.

5. The system according to claim 1, further comprising a rod being coupled to and extending away from a peripheral edge of said second panel, said rod having a distal end with respect to said peripheral edge, said rod having a bend thereon being positioned between said peripheral edge and said distal end having said distal end being directed downwardly wherein said rod is configured to have a food item suspended thereon when the food item is finished being fried thereby facilitating grease to drip from the food item.

6. The system according to claim 5, further comprising a pan being slidably coupled to said bottom surface of said bottom wall, said pan being selectively urged into an extended position having said pan being aligned with said distal end of said rod wherein said pan is configured to catch the grease dripping from the food item.

7. The system according to claim 1, further comprising a handle being coupled to said cart wherein said handle is configured to be manipulated thereby facilitating said cart to be urged along the support surface.

8. The system according to claim 1, further comprising a drawer being slidably coupled to said lower surface of said second panel wherein said drawer is configured to store objects.

9. A deep fryer system comprising:
- a deep fryer including a fuel tank, a burner and a hose being fluidly coupled between said fuel tank and said burner wherein said burner is configured to produce a flame thereby facilitating said burner to heat a container filled with a fluid; and
- a cart being configured to be rolled along a support surface, each of said fuel tank, said hose and said burner being removably positioned thereon, said cart having a first panel, a second panel and a plurality of uprights, said first panel having a top surface and a bottom surface, said second panel having an upper surface and a lower surface, each of said uprights extending between said top surface of said first panel and said lower surface of said second panel, said second panel having an aperture extending through said upper surface and said lower surface, said fuel tank being positioned on said top surface of said first panel;
- a plurality of wheels, each of said wheels being rotatably coupled to said bottom surface of said first panel wherein each of said wheels is configured to roll along the support surface;
- a box being positioned on said cart, said burner being positioned within said box, said box being configured to have the container being positioned within said box, said box being configured to inhibit the fluid in the container from escaping said box thereby reducing a fire hazard with respect to the fluid when the fluid is heated, said box having a bottom wall and a perimeter wall extending upwardly therefrom, said perimeter wall having a distal edge with respect to said bottom wall to define an opening into an interior of said box, said bottom wall being positioned on said top surface of said first panel, said box extending upwardly through aperture in said second panel having said distal edge being spaced from said upper surface of said second panel, said perimeter wall having a hole extending into an interior of said box, said hose being extended through said hole;
- a drain extending through said bottom wall of said box wherein said drain is configured to selectively drain the fluid from said box;
- a rod being coupled to and extending away from a peripheral edge of said second panel, said rod having a distal end with respect to said peripheral edge, said rod having a bend thereon being positioned between said peripheral edge and said distal end having said distal end being directed downwardly wherein said rod is configured to have a food item suspended thereon when the food item is finished being fried thereby facilitating grease to drip from the food item;
- a pan being slidably coupled to said bottom surface of said bottom wall, said pan being selectively urged into an extended position having said pan being aligned with said distal end of said rod wherein said pan is configured to catch the grease dripping from the food item;
- a handle being coupled to said cart wherein said handle is configured to be manipulated thereby facilitating said cart to be urged along the support surface; and
- a drawer being slidably coupled to said lower surface of said second panel wherein said drawer is configured to store objects.

\* \* \* \* \*